(12) United States Patent
Juan et al.

(10) Patent No.: US 11,586,393 B2
(45) Date of Patent: Feb. 21, 2023

(54) CONTROL METHOD FOR REQUESTING STATUS OF FLASH MEMORY, FLASH MEMORY DIE AND FLASH MEMORY WITH THE SAME

(71) Applicant: MACRONIX International Co., Ltd., Hsinchu (TW)

(72) Inventors: Shih Chou Juan, Taoyuan (TW); Min Zhi Ji, Taichung (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 15 days.

(21) Appl. No.: 17/138,644

(22) Filed: Dec. 30, 2020

(65) Prior Publication Data
US 2022/0206719 A1  Jun. 30, 2022

(51) Int. Cl.
G06F 3/06  (2006.01)
(52) U.S. Cl.
CPC .......... G06F 3/0679 (2013.01); G06F 3/0604 (2013.01); G06F 3/0659 (2013.01)
(58) Field of Classification Search
CPC .... G06F 3/0679; G06F 3/0604; G06F 3/0659; G06F 3/0632
See application file for complete search history.

(56) References Cited

U.S. PATENT DOCUMENTS

| | | | |
|---|---|---|---|
| 9,053,014 B2 | 6/2015 | Huffman et al. | |
| 10,222,989 B1* | 3/2019 | Zitlaw | G11C 7/1015 |
| 10,877,907 B2 | 12/2020 | Bruce et al. | |
| 2008/0117682 A1* | 5/2008 | Byeon | G06F 13/1684 365/185.18 |
| 2009/0083476 A1 | 3/2009 | Pua et al. | |
| 2010/0180182 A1 | 7/2010 | Trantham | |
| 2016/0246514 A1* | 8/2016 | Nosaka | G06F 3/0611 |
| 2018/0113826 A1* | 4/2018 | Li | G06F 13/24 |
| 2019/0235786 A1* | 8/2019 | Chun | G11C 7/1063 |
| 2019/0235790 A1* | 8/2019 | Koo | G06F 21/74 |
| 2019/0250855 A1* | 8/2019 | Kachare | G06F 12/0246 |
| 2020/0004450 A1 | 1/2020 | Secatch et al. | |
| 2021/0247931 A1* | 8/2021 | Ellis | G06F 3/0604 |
| 2022/0011959 A1* | 1/2022 | Srinivasan | G06F 3/0604 |

OTHER PUBLICATIONS

"Office Action of Taiwan Counterpart Application", dated Jun. 15, 2021, pp. 1-3.

* cited by examiner

Primary Examiner — Charles Rones
Assistant Examiner — Tong B. Vo
(74) Attorney, Agent, or Firm — J.C. Patents

(57) ABSTRACT

A control method for a flash memory, a flash memory die and the flash memory are provided. The control method includes: in a setup stage, under an operation mode of a command input, issuing by a host a setup command to map each port of an external data bus of each flash memory die respectively to a status index of each flash memory die; and in a request stage, under the operation mode of the command input, issuing by the host a request command to each flash memory die, and under the operation mode of a data output, a status of the status index of each flash memory die is transmitted to the host through the ports of the external data bus respectively.

8 Claims, 12 Drawing Sheets

CONTROL METHOD FOR REQUESTING STATUS OF FLASH MEMORY, FLASH MEMORY DIE AND FLASH MEMORY WITH THE SAME

TECHNICAL FIELD

The invention relates to a flash memory, and in particular to a control method of a flash memory and a flash memory die.

DESCRIPTION OF RELATED ART

Currently, the NAND flash memory controllers are facing a significant increase in the number of NAND flash memory dies to be controlled, which results in an increase in the number of pads of the controller and the size of the die will also increase. In addition, the ready/busy (R/B) signals of all logic units are also connected to a shared R/B signal line. Therefore, if it needs to confirm which logical unit is busy when the shared R/B signal line is busy, a "read status command" has to be issued to inquire whether the specified logical unit is ready or busy.

Generally speaking, the implementation of the R/B state of NAND flash memory uses an open drain design. FIG. 1 shows a schematic circuit diagram of an open drain of a NAND flash memory. As shown in FIG. 1, there are multiple NAND flash memory dies $0, 1, 2, \ldots$ in one channel and the R/B status outputs are connected to a common open drain output, respectively. FIGS. 2A and 2B illustrate that two current design methods for the multi-channel NAND flash memory.

As shown in FIG. 2A, in this configuration, the R/B signal line of each NAND flash die in each channel is independent, that is, each flash memory die $10\_0\sim10\_m-1$ is provided with an R/B signal line to connect to the flash memory controller 20, and therefore, in each channel, the number of the pads of the flash memory controller 20, which corresponds to the number of the R/B signal lines, has to be also provided.

FIG. 2B illustrates another configuration of a NANA flash memory. As shown in FIG. 2B, in this configuration, each flash memory die $10\_0\sim10\_m-1$ in each channel shares an R/B signal line, that is, is shorted together. However, under this configuration, the flash memory controller 20 may not confirm which NAND flash memory die $10\_0\sim10\_m-1$ is busy, and additional time must be spent to confirm the read/busy status of each flash memory die $10\_0\sim10\_m-1$. In other words, in this configuration, although the number of pads can be reduced, additional time is required to confirm the RB status of each flash memory die $10\_0\sim10\_m-1$.

Therefore, there is a need in the art that can reduce the number of pads and no additional time is required to confirm which flash memory die is busy.

SUMMARY

According to an embodiment, the disclosure provides a control method for a flash memory, wherein the flash memory includes an external data bus to which a plurality of flash memory dies is coupled, the control method comprising: in a setup stage, under an operation mode of command input, issuing by a host a setup command to map each port of the external data bus respectively to a status index of each of the plurality of the flash memory dies; and in a request stage, under the operation mode of command input, issuing by the host a request command to each of the plurality of flash memory dies, and under the operation mode of data output, status of the status index of each of the plurality of flash memory dies is transmitted to the host through the ports of the external data bus respectively.

According to another embodiment, the present disclosure provides a flash memory die, at least comprising: a plurality of output ports, coupled to an external data bus; a control logic unit, providing status index of the flash memory die; a mapping status register, storing data used to indicate selecting one of the plurality of output ports that is corresponding to the status index of the flash memory die; and an input/output (I/O) control unit. The input/output (I/O) control unit further includes a first multiplexor and a demultiplexor. The first multiplexer has a plurality of inputs and an output coupled to the plurality of output ports, wherein the plurality of inputs receives data respectively from a plurality of internal buses, the first multiplexer selects one of the plurality of inputs and outputs the selected input to the external data bus according to a selection signal from the control logic unit, and the plurality of internal data buses includes at least an internal data bus, and status index bus and a mapping status bus. The demultiplexor has an input, outputs and a select line, where the input receives the status index, the select line receives the data stored in the mapping status register, and the outputs of the demultiplexor are coupled to one of the inputs of the first multiplexer through the mapping status bus, wherein the demultiplexor selects one of the outputs based on the data received from the select line to transmit the status index, and non-selected outputs of the demultiplexor output a high impedance state.

According to another embodiment, the present disclosure provides a control method for a flash memory, wherein the flash memory includes an external data bus to which a plurality of flash memory dies is coupled. The control method comprises: issuing by a host a setup command to map each port of the external data bus respectively to a status index of each of the plurality of the flash memory dies; issuing by the host a request command to each of the plurality of flash memory dies; and when each of the plurality of flash memory dies in each channel receives the request command, status of the status index of each of the plurality of flash memory dies is transmitted to the host through the ports of the external data bus respectively.

According to another embodiment, the present disclosure provides a flash memory, comprising: at least one external data bus having a plurality of ports; a plurality of flash memory dies respectively coupled to the at least one external data bus; and a host, coupled to the at least one external data bus to control the plurality of flash memory dies. In a setup stage, the host issues a setup command to map each port of the external data bus respectively to a status index of each of the plurality of the flash memory dies, and in a request stage, the host issues a request command to each of the plurality of flash memory dies, and in a case that each of the plurality of flash memory dies receives the request command, status of the status index of each of the plurality of flash memory dies is transmitted to the host through the ports of the external data bus respectively.

In summary, under the configuration of the embodiment, the vendor-specific commands and data bus are used to substitute the R/B signal line of flash memory die, and therefore, the original R/B signal lines and pads of each flash memory die can be reduced, so that the multi-channel flash memory controller correspondingly does not require the RB pad. Therefore, the number of pads of the controller can be effectively reduced.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
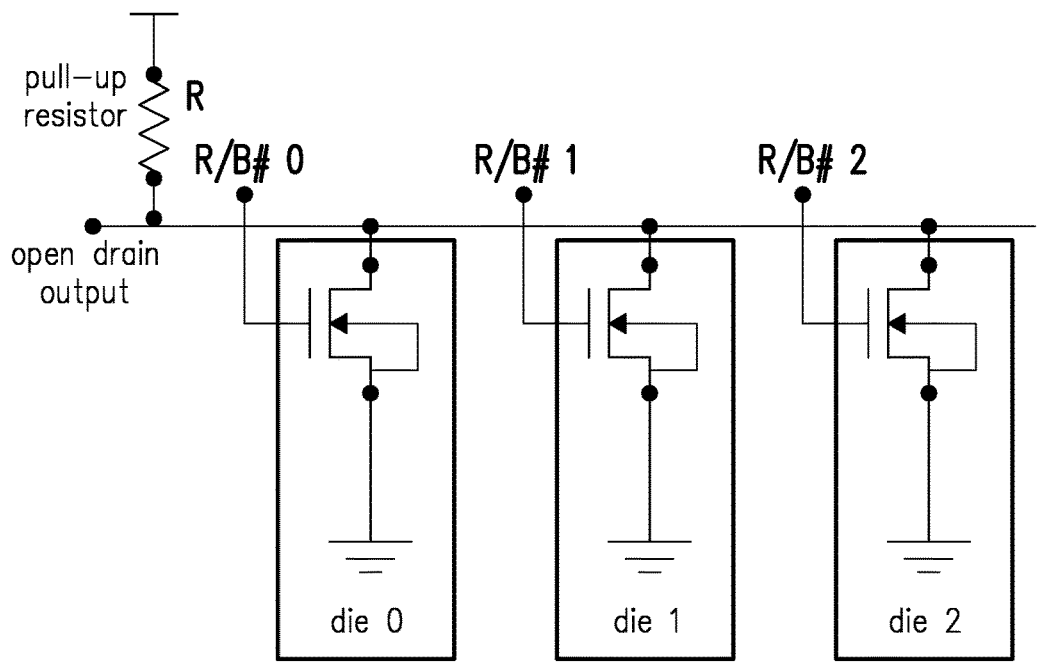
FIG. 1 is a schematic diagram of an open drain output of a conventional multi-channel NAND flash memory die configuration.
Figure 2A:
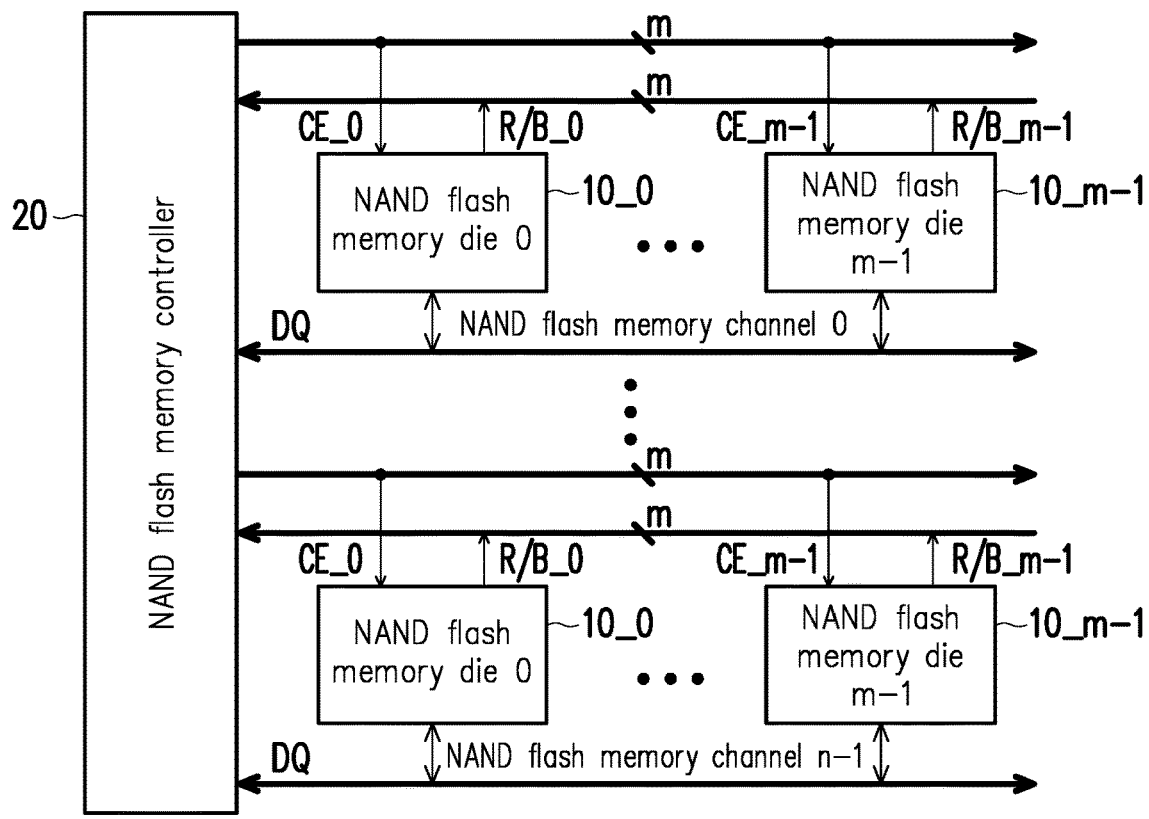
FIG. 2A and FIG. 2B are schematic diagrams of the conventional multi-channel NAND flash memory configuration.
Figure 2B:
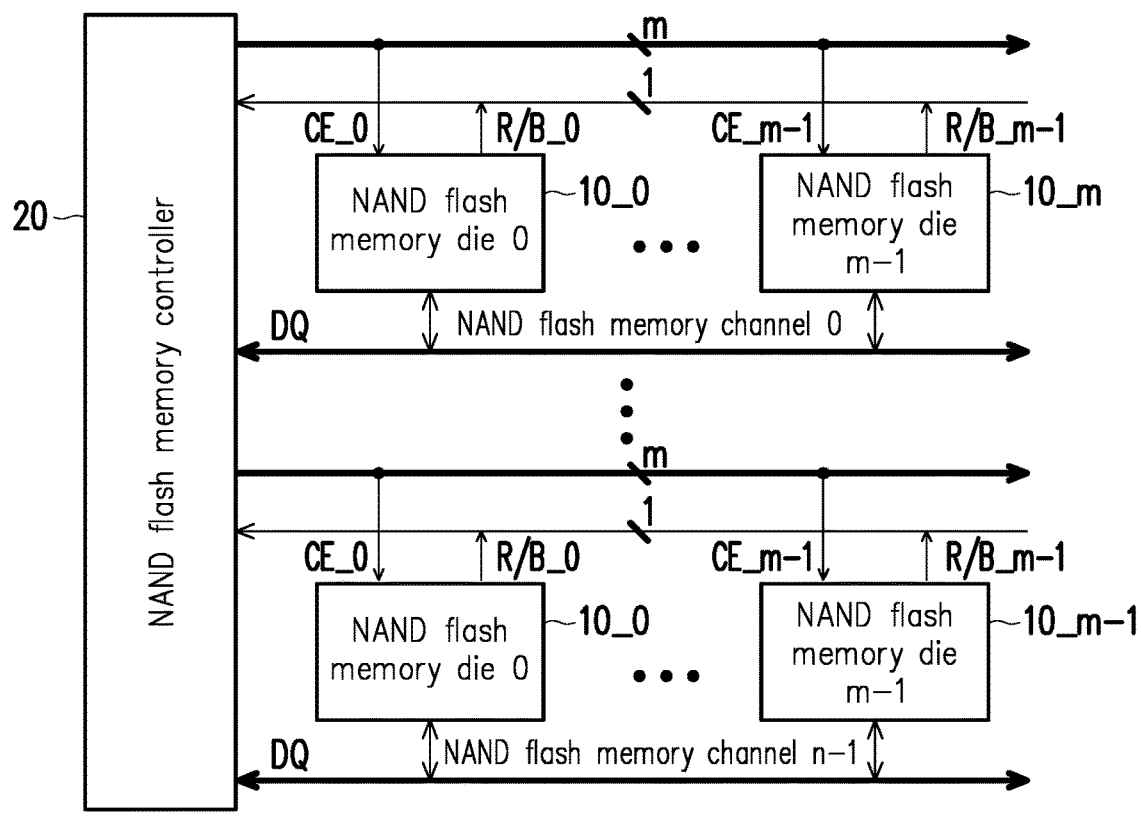
Figure 3A:
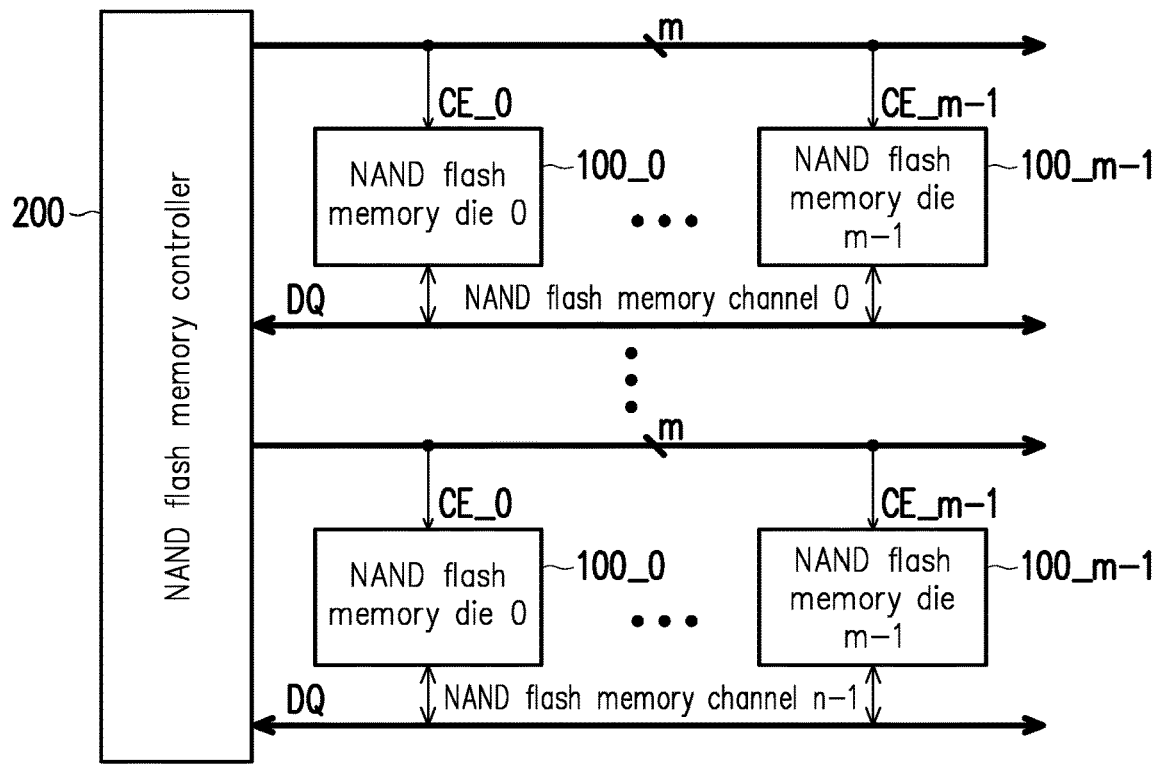
FIG. 3A is a schematic diagram of a multi-channel flash memory configuration according to an embodiment of the disclosure.
Figure 3B:
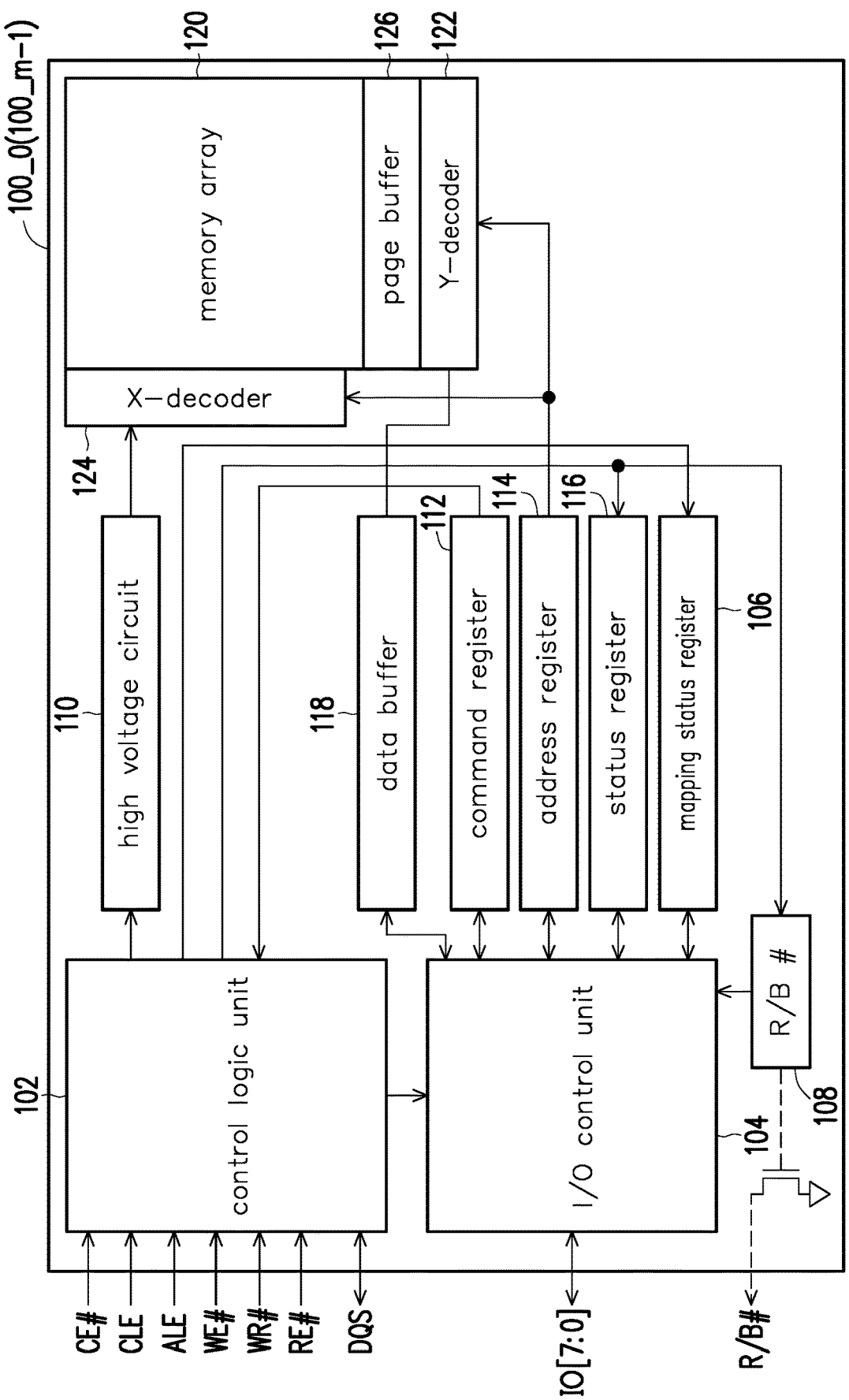
FIG. 3B is a schematic structural diagram of a NAND flash memory die according to an embodiment of the disclosure.

FIG. 3A is a schematic diagram of a multi-channel flash memory configuration according to an embodiment of the disclosure. FIG. 3B is a schematic structural diagram of a NAND flash memory die according to an embodiment of the disclosure, that is, a schematic structural diagram of each NAND flash memory die in each channel in FIG. 3A. Although FIG. 3A shows a multi-channel flash memory configuration, but the embodiment will describe an example of one channel flash memory configuration. The method or configuration may be applicable to one channel or multi-channel flash memory configuration.

As shown in FIG. 3A, a multi-channel NAND flash memory controller 200 or a host 200 can be connected with n channels (0~n−1) of flash memory dies. Each channel can comprise a plurality of flash memory dies. For example, there are m NAND flash memory dies 100_0~100_*m*−1 in each of the flash memory channels 0~n−1. In addition, each of the m NAND flash memory dies 100_0~100_*m*−1 of each channel has at least chip enable signals (chip enable) CE_0~CE_m−1, which are respectively connected to the multi-channel NAND flash memory controller 200. In addition, the input/control unit of each NAND flash memory die 100_0~100_*m*−1 can transmit data to and receive data from the multi-channel NAND flash memory controller 200 through a data bus (an external data bus) DQ.

Furthermore, as shown in FIG. 3A, in this configuration, each NAND flash memory die 100_0~100_*m*−1 does not use R/B pads as in the prior art to transmit the ready and busy (R/B) status (a status index signal) corresponding to each NAND flash memory die 100_0~100_*m*−1. According to an embodiment of the present disclosure, each port of the data bus DQ (using 8 ports as an example, such as DQ [7:0]) is used to transmit the R/B signal for each NAND flash memory die 100_0~100_*m*−1. The data bus DQ may be referred as an external bus. In other words, in the embodiment, the internal R/B port is mapped to a designated DQ port to perform R/B status detection of the NAND flash memory dies 100_0~100_*m*−1.

The status index here may be various internal states, parameters, etc. of the flash memory dies of each channel, such as ready/busy for host, ready/busy for flash array. In this embodiment, the ready/busy state for host (R/B for host) will be used as an example of the status index. In this way, this embodiment will not use external R/B pads and signal lines, so the number of pads of the controller can be reduced. The detailed operation flow will be described in detail later. The R/B for host status indicates whether the data buffer (such as the data buffer 118 in FIG. 3B) of the flash memory die is empty for receiving next data transmitted from the host, but the data is not yet written to the memory array. The R/B for flash array status indicates whether the data is written to the memory array.

FIG. 3B is a schematic structural diagram of a NAND flash memory die according to an embodiment of the disclosure. As shown in FIG. 3B, the NAND flash memory die 100_0 (the structure of the NAND flash memory dies 100_1~100_*m*−1 is the same) is basically the same as the structure of the general NAND flash memory die, the difference is in that circuit blocks for mapping the R/B signal lines to the DQ ports are provided.

As shown in FIG. 3B, the NAND flash memory die 100_0 of the embodiment is also provided with basic circuit blocks, such as a control logic unit (control logic) 102, an I/O control unit (I/O control interface) 104, a memory array 120, an X-decoder 124, a Y-decoder 122, and page buffer 126, the high voltage circuit 110, a command register 112, an address register 114, a status register 116, a data buffer 118, and a data bus DQ. The functions and operations of the basic circuit blocks of the NAND flash memory dies 100_0 are basically the same as or similar to the existing architecture, and the actual architecture does not affect the implementation of this embodiment, so detailed descriptions are omitted here.

According to the present embodiment, the NAND flash memory die 100_0 has at least a mapping status register 106, and in this embodiment an example of R/B mapping to DQ port is used. The mapping status register 106 can store a value that is a one-to-one mapping relationship between each port DQ0~DQ7 of the data bus DQ respectively to the R/B signal lines of the NAND flash memory dies 100_0~100_*m*−1. Namely, the mapping status register 106 of the NAND flash memory die 100_0 stores data that indicates which DQ port will be assigned to the R/B signal lines of the NAND flash memory dies 100_0 for outputting the R/B for host status. For example, if the NAND flash memory dies 100_0 will use the DQ0, data stored in the mapping status register 106 of the NAND flash memory die 100_0 may be a value of "0", which is the same for other NAND flash memory die 100_1~100_m−1. Each NAND flash memory die only stores the DQ port to be used in the mapping status register 106. In addition, the host (flash memory controller 200) may be provided with a correspondence table recording that each port (DQ [7:0]) is used to output the status indicator of which NAND flash die.

In this way, when the multi-channel NAND flash memory controller 200 issues a request signal (refer to a request stage to be detailed later) to each flash memory die 100_0~100_m−1 in order to acquire the status of the R/B signal line, the I/O control unit 104 of each flash memory die 100_0~100_m−1 can issue an R/B signal at the corresponding DQ port. In this way, the multi-channel NAND flash memory controller 200 can acquire once the status of the R/B signal line of each flash memory die 100_0~100_m−1 from each port DQ0~DQ7 on the data bus DQ.

With the above structure, the logic control unit 102 does not require to use the internal R/B signal to transmit the R/B status through the R/B pads of the I/O control unit 104, and therefore the external R/B signal lines and pads are not required. Thus, the R/B pads of the multi-channel NAND flash memory controller 200 are also not required, and the number of pads can be reduced. As shown by the dashed-line in the lower left corner of FIG. 3B, this embodiment can completely omit this part of the hardware structure.

Figure 3C:
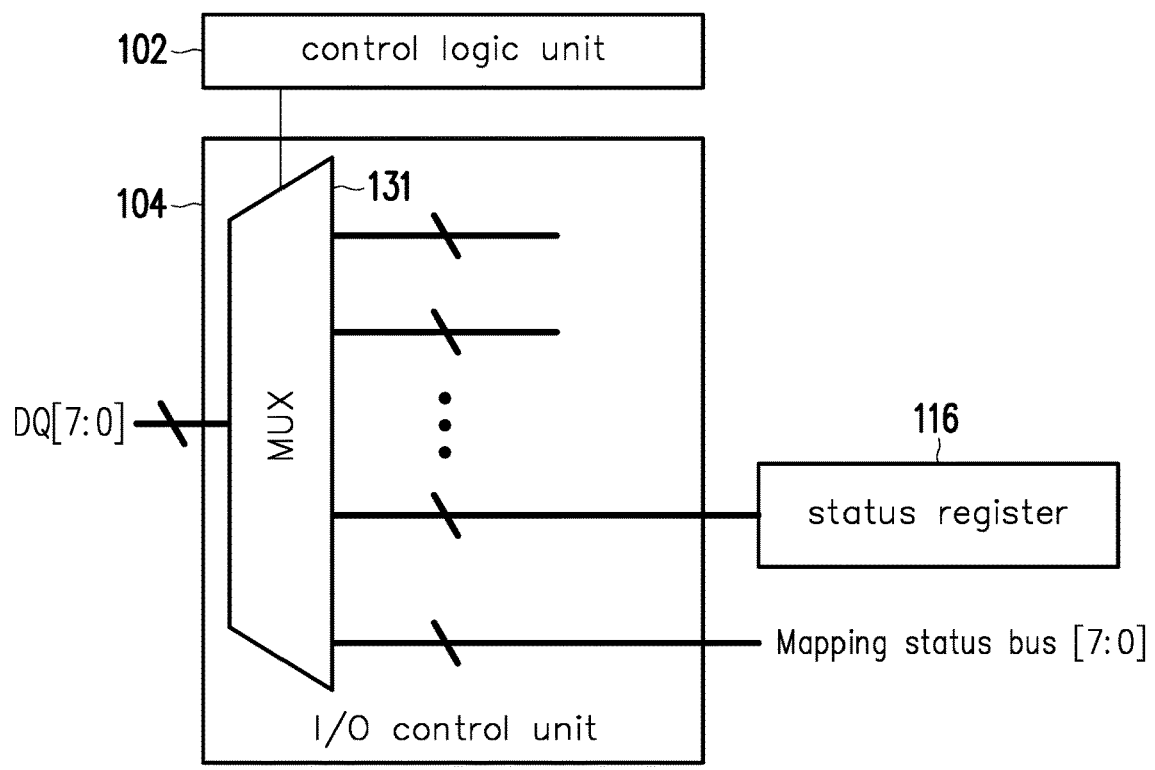
FIGS. 3C and 3D further illustrates a schematic diagram of circuit configuration for the I/O control unit and the control logic unit of the NAND flash memory die.
Figure 3D:
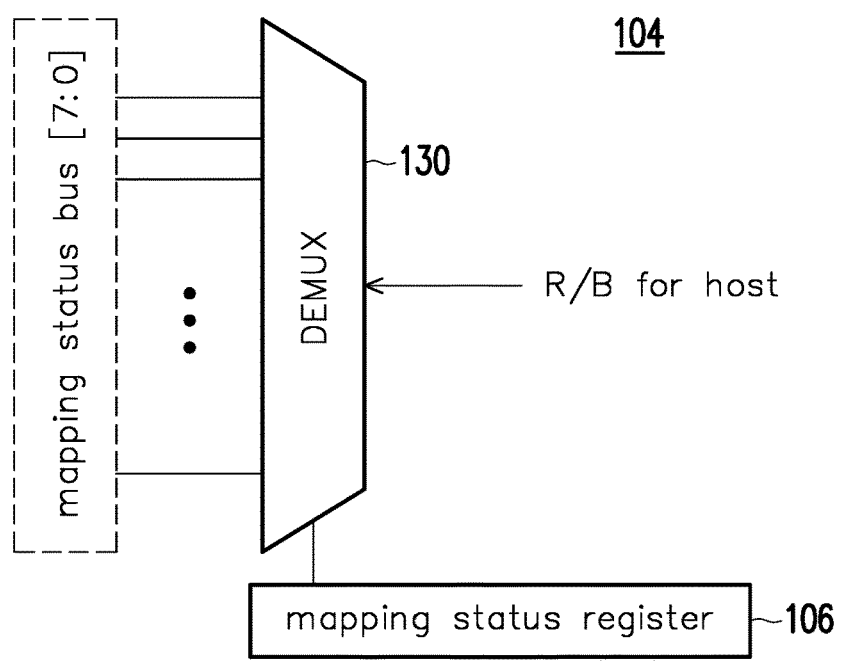

FIGS. 3C and 3D further illustrate a schematic diagram of the hardware structure of I/O control unit 104 of the present embodiment of FIG. 3B. The NAND flash memory die shown in FIGS. 3C and 3D only depicts circuit blocks related to this embodiment, and the other portions are omitted. As shown in FIG. 3C, the I/O control unit 104 may further include a multiplexor (first multiplexor) 131 having a plurality of internal buses as inputs thereof. For example, each internal bus can include 8 signal lines. Through the internal buses, the multiplexor 131 can select one of the inputs thereof, i.e., one of the internal data buses (for general data transmission), the status bus (transmission of status index of flash memory die) and the mapping status bus (such RB to DQ port) can be selected to output through the port (DQ [7:0]) according to a selection signal line of the logic control unit 102. The DQ bus can output various output signals, such as data status of the flash memory die or the R/B status (i.e., R/B to DQ port) of the embodiment. In this embodiment, the R/B for host status is used as an example. In addition, the mapping status register 106 stores data for indicating which port is used to output the R/B status. As shown in FIG. 3D, the demultiplexor 130 has an input, outputs and a select line. The output of the demultiplexor 130 and one of the inputs of the multiplexor 131 are coupled through the mapping status bus ([7:0]). The input of the demultiplexor 130 receives the R/B for host from the mapping status register 106. The demultiplexor 130 receives the data stored in the mapping status register 106 through the select line so as to output the status of the R/B for host of the flash memory die through the corresponding port (one of the mapping status bus ([7:0])). Therefore, the multiplexor 131 in FIG. 3C can select the corresponding port to output the status of the R/B for host.

Figure 3E:
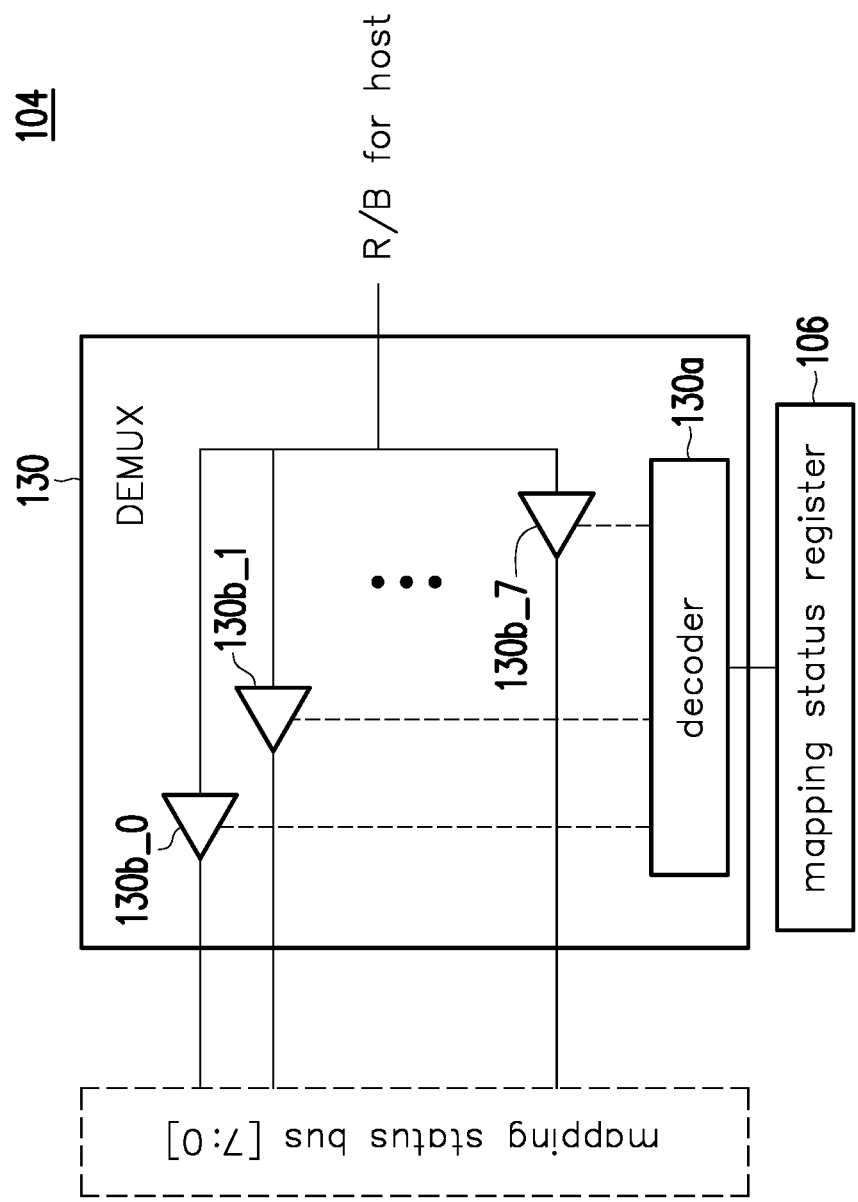
FIG. 3E is a circuit configuration of the demultiplexor shown in FIG. 3D.

In addition, FIG. 3E shows a schematic diagram of a circuit configuration of the demultiplexor 130 in FIG. 3D. As shown in FIG. 3E, the DEMUX 130 further comprises a decoder 130a and a plurality of pass gates. In the embodiment, a tri-state gate is used as an example for the pass gate. The tri-state gates 130b_0~130b_7 (8 tri-state gates are used to correspond to the DQ port [7:0] respectively in this embodiment). The output of each tri-state gate 130b_0~130b_7 is coupled to its corresponding DQ port DQ [7:0]. The decoder 130a may receive and decode the data from the mapping status register 106, and thereby the R/B for host status input to the DEMUX 130 may pass through the corresponding tri-state gate (one of the tri-state gate 130b_0~130b_7) and is output from the corresponding DQ port DQ [7:0]. For example, if the NAND flash memory die 100_1 uses the DQ port DQ1 for outputting the R/B for host status, the mapping status register 106 may store data of a value "1". For example, when a value of the data stored in the mapping status register 106 is 1, it means that the DEMUX 130 decodes the value to a signal of 0000_0010 by the decoder 130a, and then the tri-state gates 130b_0~130_7 enables the port DQ1 based on the received signal 0000_0010 and the other ports become high impedance status. Namely, the S/B for host status is output through DQ1. At this time, the decoder 130 makes the tri-state gate 130b_1 to be enabled and the other tri-state gate 130b_0, 130b2~130b_7 to be disabled to be in the high impedance status, so that the multiplexor 131 in FIG. 3C may select the DQ1 to output the R/B for host status.

In the embodiment, each NAND flash memory die only selects one DQ ports as the output for outputting the status index (the R/B for host status in this embodiment. On the other hand, the other DQ ports of the NAND flash memory die are in a status of high impedance.

As described above, the status of the internal R/B signal line can be transmitted to the NAND flash memory controller 200 by using the corresponding DQ port through the data bus DQ. For example, the R/B signal line of the flash memory die 100_0 is mapped to the DQ port DQ0, and the R/B signal line of the flash memory die 100_1 is mapped to the DQ port DQ1.

Therefore, in this way, for each channel of multiple flash memory dies 100_0~100_m−1, the multi-channel NAND flash memory controller 200 can obtain the R/B status of multiple flash memory dies 100_0~100_m−1 at a time on the data bus DQ through the DQ ports DQ0~DQ7. Therefore, the NAND flash memory controller 200 does not require additionally the external R/B signal lines and pads, which the number of the pads of the controller can be effectively reduced.

Figure 4A:
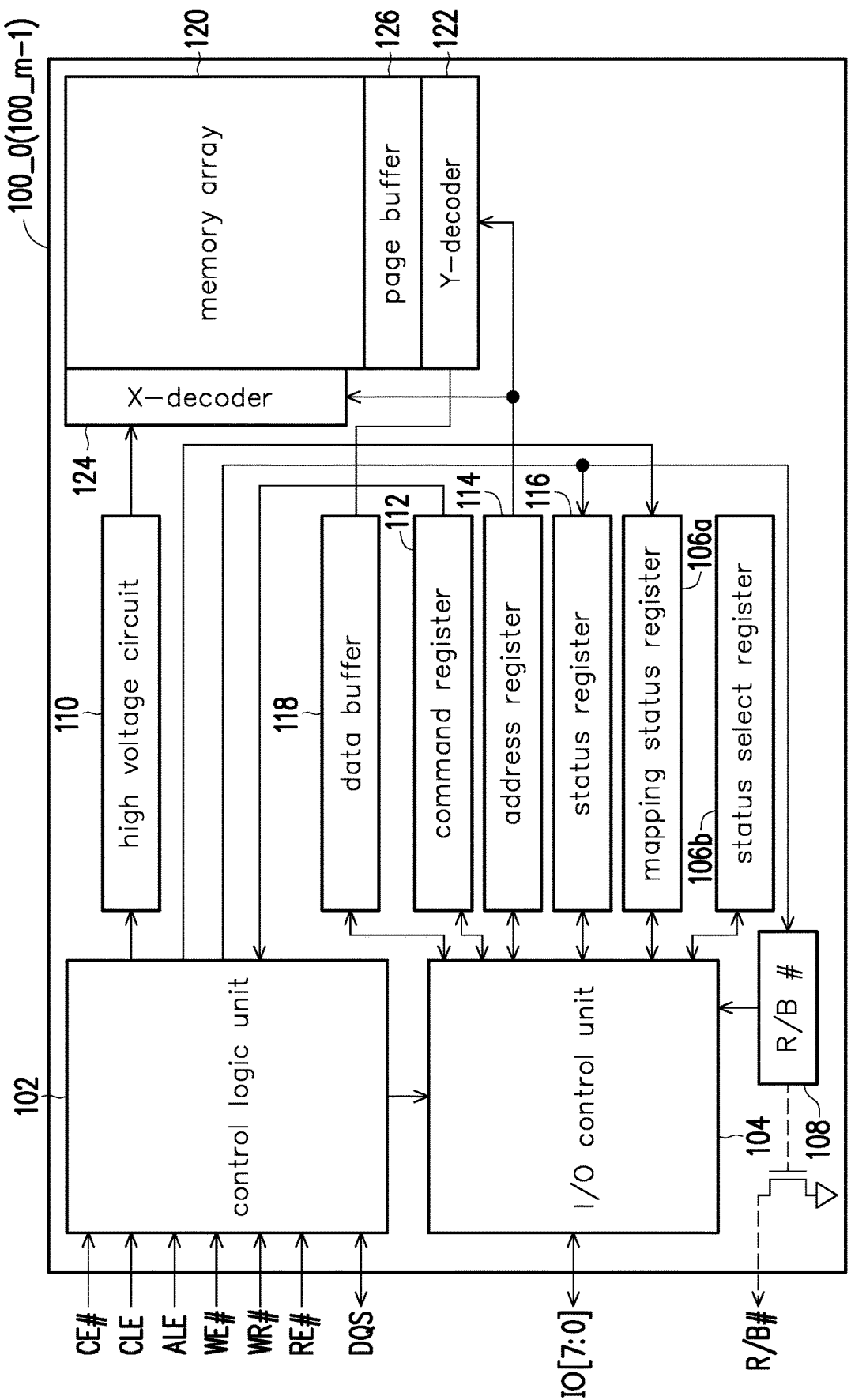
FIG. 4A is a schematic structural diagram of a NAND flash memory die according to another embodiment of the disclosure.
Figure 4B:
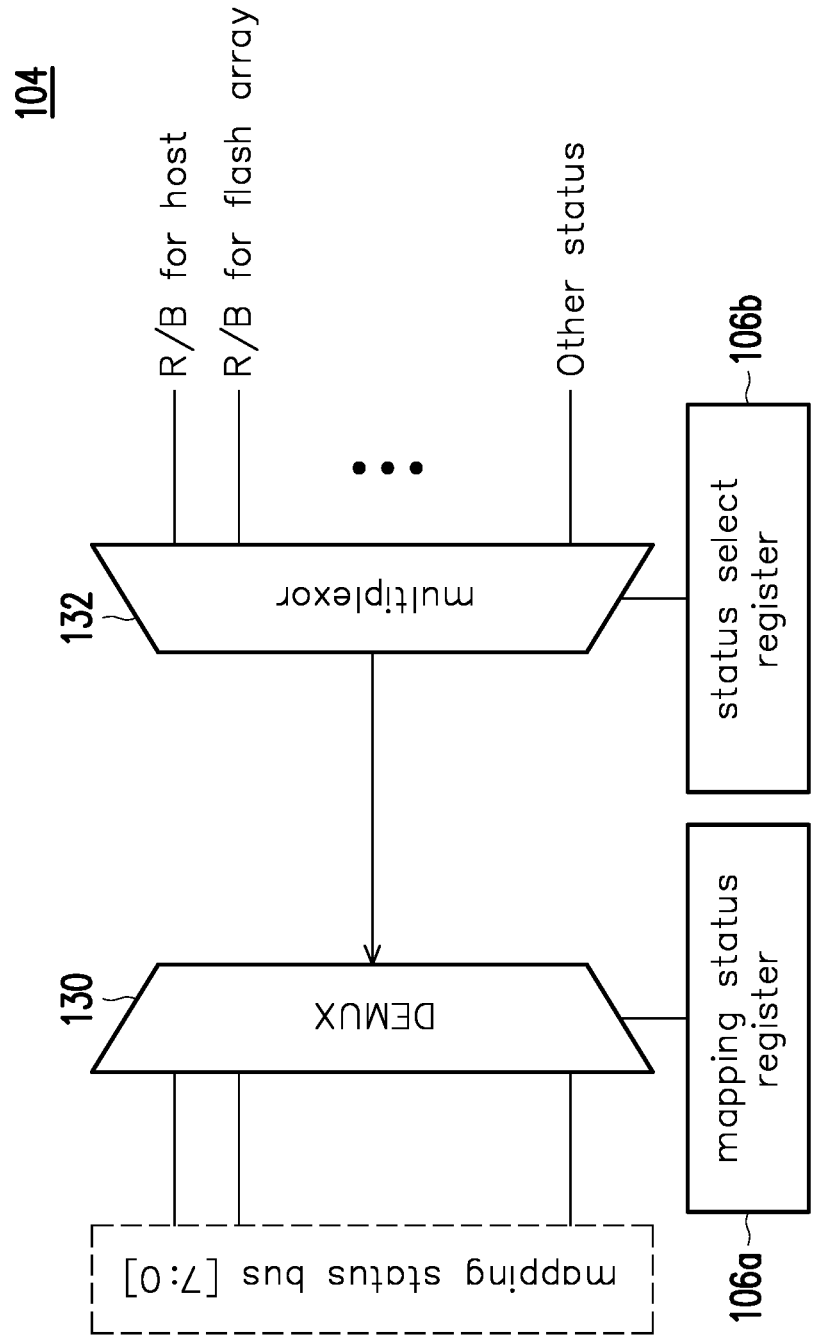
FIG. 4B illustrates a schematic diagram of circuit configuration for the I/O control unit of FIG. 4A.

FIG. 4A is a schematic diagram showing a configuration of a NAND flash memory die according to another embodiment, and FIG. 4B is a schematic diagram showing a circuit configuration of the I/O control unit in FIG. 4A. As shown in FIG. 4A, in addition to the mapping status register 106a, the I/O control unit 104 further includes a status select register 106b is further included. The data stored in the mapping status register 106a may hint the NAND flash memory die 100_0 ( . . . 100_m−1) that which port among the DQ port [7:0] will be used to output the status index (such as the R/B for host status), and the data stored in the status select register 106b may hint the NAND flash memory die 100_0 ( . . . 100_m−1) that which status index will be selected to be output.

In the above description related to FIGS. 3B to 3E, one status index is used as an example, that is, the R/B for host status. However, as mentioned above, the application of the present disclosure is not limited to the R/B for host status, but can be other status indices or parameters of the NAND flash memory die 100_0 ( . . . 100_m−1). In other words, in this embodiment, one of the plurality of status indices of the NAND flash memory die 100_0 ( . . . 100_m-1) may be selected to be output through the corresponding DQ port.

As shown in FIG. 4B, in the configuration of this embodiment, in addition to the DEMUX 130, a multiplexor 132 (second multiplexor) is further included. In addition, the logic control unit 102 may further include a plurality of status registers, and one of the status registers may be selected to output to the multiplexor 132. The multiplexor 132 may receive plural statuses from the plurality of status registers, such as the R/B for host, the R/B for flash array and other status. In addition, the multiplexor 132 is further coupled to the status select register 106b. The multiplexor 132 may select one of the status registers such as the R/B for host, the R/B for flash array and other status based on the data received from the status select register 106b. Therefore, the DEMUX 130 can output the status selected by the status select register 106b from the corresponding port according to the data stored in the mapping status register 106a.

As shown in FIG. 4B, the multiplexor 132 is coupled to the DEMUX 130. The status index selected by the multiplexor 132 is input to the DEMUX 130. The operation of the DEMUX 130 is the same as the DEMUX 130 in FIGS. 3D and 3E. The DEMUX 130 may receive and decode the data from the mapping status register 106a. In this way, the status index selected by the multiplexor 132 may be output from the corresponding DQ port (selected by the multiplexor 131 in FIG. 3C) assigned by the data stored in the mapping status register 106a. Therefore, the multiplexor 132 may select one of the plural status indices to use the data bus DQ to transmit the status.

Namely, as shown in FIG. 4B, according to the signal of the status select register 106b as a selection line, the multiplexor 132 selects, as an output, one from the R/B for host status, R/B for flash array status and other status. For example, the multiplexor 132 selects the R/B for flash array status as a status to be output according to the selection of the status select register 106b. At this time, the DEMUX 130 receives the signal (i.e., the RB for flash array status) output from the multiplexor 132, and selects port 6 (an example) based on decoding the data of the mapping status register 106a. In this example, in the output results of eight ports of the DEMUX 130, the ports 0~5 and 7 are in high impedance status, and the port 6 is used to output the RB for flash array status.

Next, according to the selection line of the control logic unit 102, the multiplexor 131 (FIG. 3C) uses the output (the port 6 for outputting the RB for flash array status, the other ports are in high impedance status) of the eight ports of the DEMUX 130 as one of selections of the multiplexor 131. If the host issues the request command according to the embodiment, the port in the output of the eight ports of the DEMUX 130 will be selected as the output DQ [7:0].

According to this variation example, the DQ port of the data bus DQ are not only limited to map to a single status index, but can be dynamically controlled by the host, that is, the multi-channel NAND flash memory controller 200 to select the required status index to transmit status through the data bus DQ, and therefore, the control of the NAND flash memory die can be operated more flexibly. Except for the multiplexor 132, the DEMUX 130 operates in the same manner as in FIGS. 3D to 3E, so their corresponding descriptions are omitted.

Figure 5:
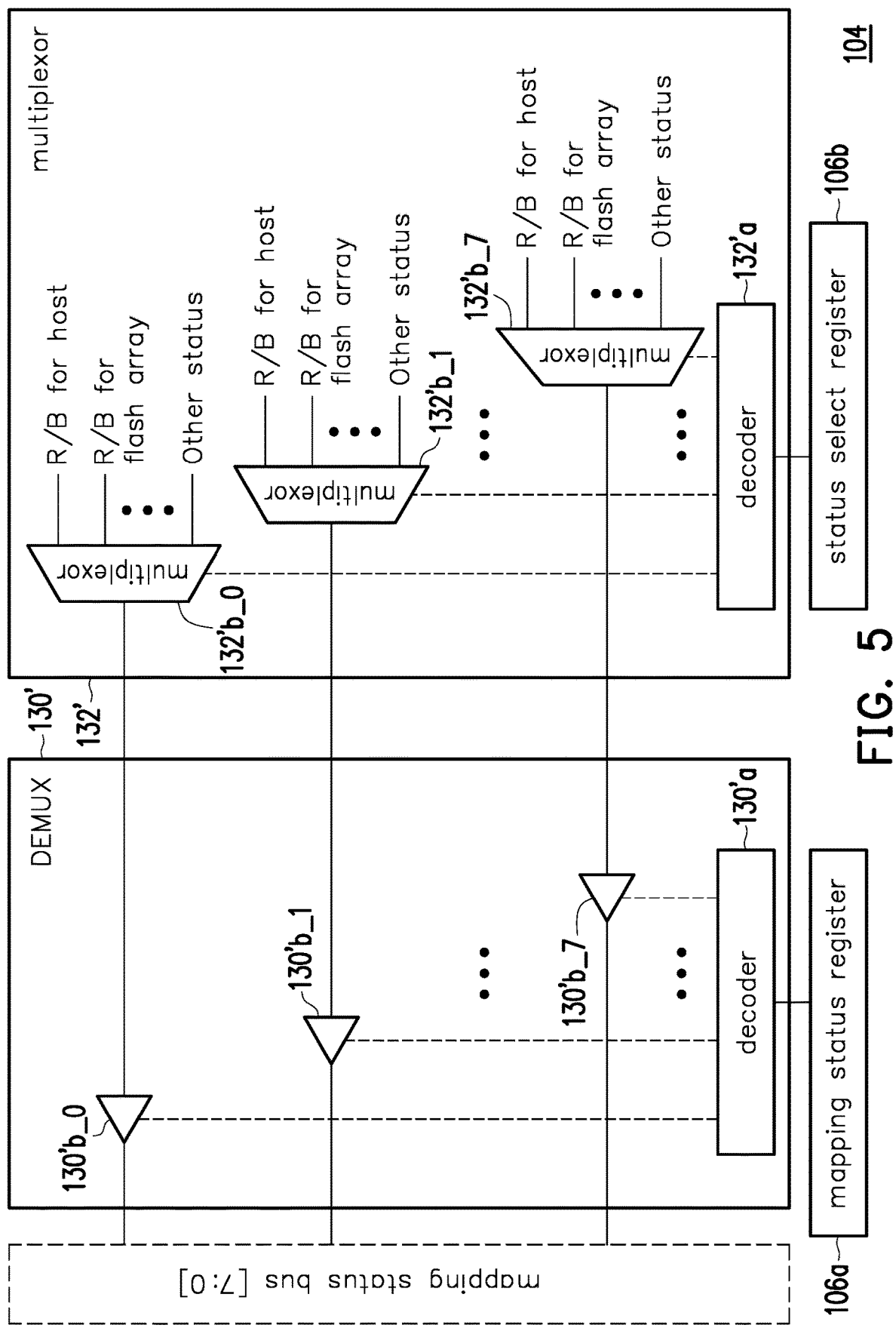
FIG. 5 illustrates a schematic diagram of another circuit configuration for the I/O control unit of FIG. 4A.

FIG. 5 is a schematic diagram showing a circuit configuration of an I/O control unit of the flash memory die according to another embodiment. As shown in FIG. 5, the circuit configuration of the demultiplexor and the multiplexor are different from those shown in FIG. 4B. Referring to FIG. 5, the DEMUX 130', for example, includes decoder 130a' and a plurality of tri-state gates 130'b_0~130'b_7 (8 tri-state gates are depicted as an example), and the decoder 130'a is further coupled to each tri-state gate 130'b_0~130'b_7. The multiplexor unit 132' further includes a decoder 132'a and a plurality of multiplexors 132'b_0~132'b_7 (for example, 8) multiplexors), and the decoder 132'a is further coupled to each multiplexor 132'b_0~132'b_7. Each multiplexor 132'b_0~132'b_7 of the multiplexor unit 132' is respectively coupled to the tri-state gates 130'b_0~130'b_7 of the DEMUX 130'. In addition, each multiplexor 132'b_0~132'b_7 receives plural statuses from a plurality of status registers, such as the R/B for host, the R/B for flash array and other status.

The decoder 132'a of the multiplexor unit 132' receives and decodes the data from the status select register 106b, and thereby each of the multiplexors 132'b_0~132'b_7 may select one of the status registers input thereto. For example, the multiplexor 132'b_0 may select one of the status registers such as the R/B for host, the R/B for flash array and other status and then provides the selected status index to the corresponding tri-state gate 130'b_0, the multiplexor 132'b_1 may also select and provide one status index to the corresponding tri-state gate 130'b_1, and the others are the same. In addition, the decoder 130'a of the DEMUX 130' may receive and decode the data from the mapping status register 106a, so that the corresponding tri-state gates 130'b_0~130'b_7 are enabled and the status indices may be respectively output through the corresponding DQ port [7:0].

For example, the DEMUX 130 will select which ports are used to output the status, and the other ports are in the high impedance status. As an example, if the decoded result of the decoder 130'a is 0000_1100, it means that the ports 2 and 3 are used to output status and the other ports are in the high impedance status. In addition, the status select register 106b stores the status to be output for each port. The multiplexor (the second multiplexor) 132' will determine that each port of the 8 ports will select which status as its output. For example, if the decoded result of the decoder 132'a is 111_1211 and assumes "1" represents the R/B for host status and "2" represents the R/B for flash array, the port 2 of the eight ports of the multiplexor 132' is used to output the R/B for flash array status and the other ports (i.e., the ports 0-1, 3-7) are used to output the R/B for host status. As a result, the multiplexor 131 (see FIG. 3C) select the eight ports are that the port 2 is for outputting the R/B for flash array status, the port 3 is for outputting R/B for host status, and the other 6 ports are in the high impedance status.

In this embodiment, in comparison with the case that one flash memory die only assigns one DQ port to output the status index as shown in FIG. 3E, one flash memory die may assign multiple DQ ports respectively corresponding to one status index. Therefore, for one flash memory die, the status indices may be output through the corresponding DQ ports at the same time. In this embodiment, since the flash memory die may output multiple status indices, a corresponding relationship between the status indices and DQ ports will be stored in the status select register 106b in a certain data format.

Next, the operation method of the above-mentioned circuit configuration will be described, and referring to FIGS. 6A to 6C, how the DQ ports of the data bus DQ are mapped to the R/B signal lines will be described in details. Here, FIGS. 6A to 6C are diagrams for explaining the timing of operations after the flash memory die receives the command from the host.

Figure 6A:
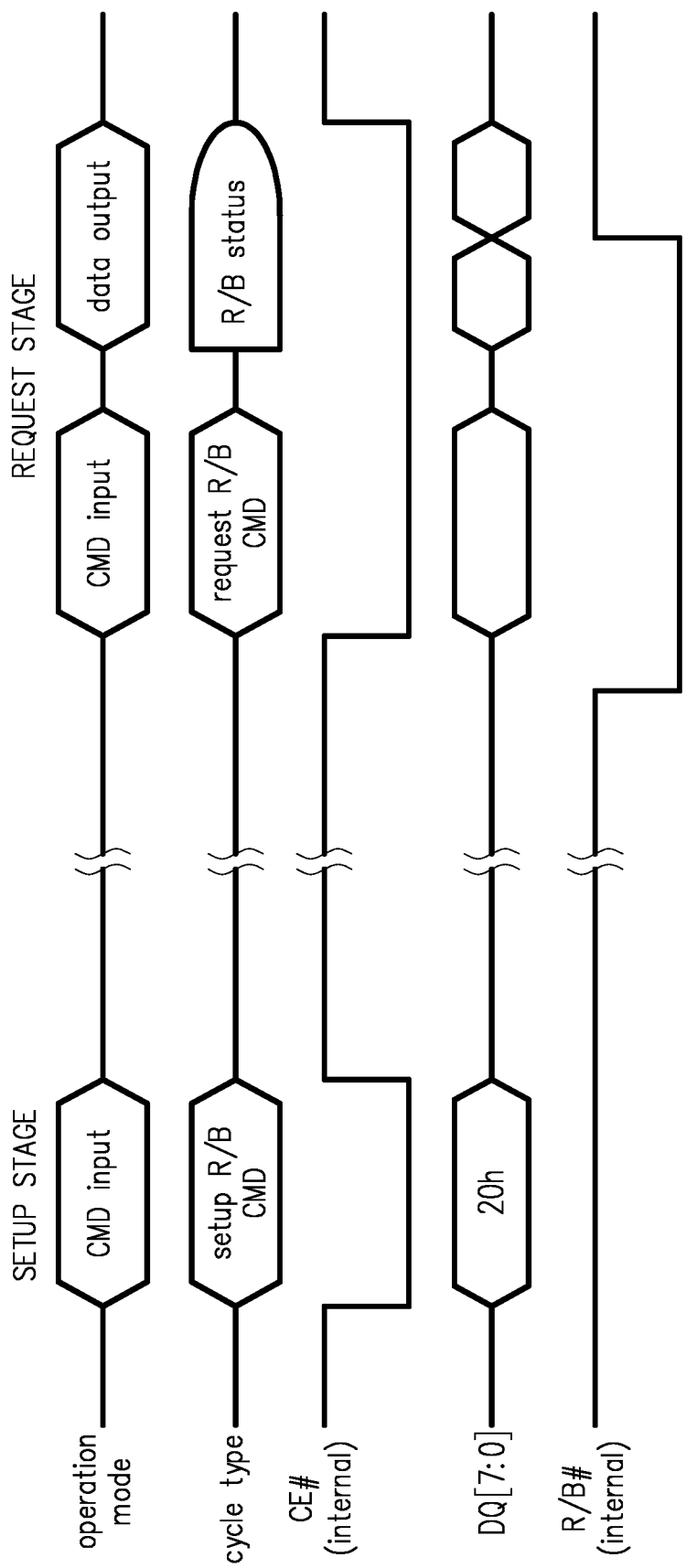
FIG. 6A is a timing diagram illustrating an operation flow of each flash memory die of a control method of a NAND flash memory according to an embodiment of the disclosure.
Figure 6B:
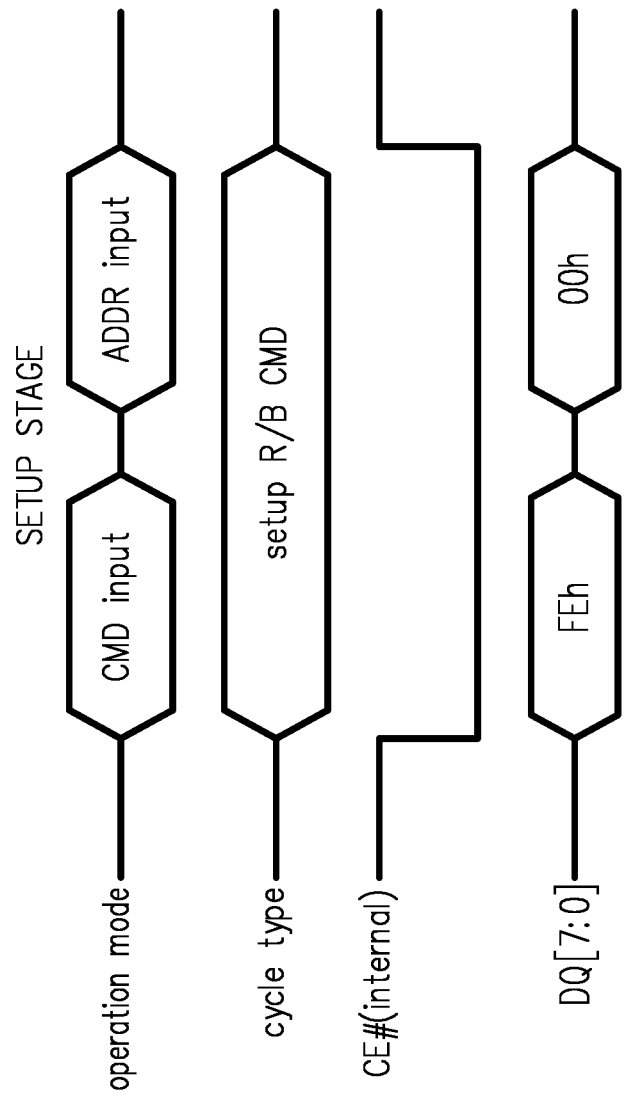
FIG. 6B is a timing diagram illustrating an operation flow of each flash memory die of a control method of a NAND flash memory according to another embodiment of the disclosure.

FIG. 6A is a timing diagram illustrating an operation flow of each flash memory die of a control method of a NAND flash memory according to an embodiment of the disclosure, which is a timing diagram for the flash memory die level. As shown in FIG. 4A, the control method of this embodiment divides the operation mode of the data bus DQ into two stages, namely a setup stage and a request stage. This embodiment mainly uses the time period when the data bus DQ is in an idle state. In this example, the data bus DQ has 8 ports as an example DQ0~DQ7, but could be properly modified on demand for NAND flash memory die. In addition, the operation for host level will be explained with reference to FIG. 7A.

As shown in FIG. 6A, in the setup stage, under the operation mode of CMD input (based on the specification of data transmission of the data bus DQ), at this time, the cycle type is to set the R/B command, i.e., when each NAND flash memory die 100_0 ( . . . 100_m–1) receives a setup command issued by the NAND flash memory controller (host) 200, and then each port DQ0~DQ7 of the data bus DQ is assigned to correspond to the R/B status (status index) of each flash memory die 100_0~100_m–1 in the channel of the flash memory.

Here, the setup command may use vendor-specific commands to respectively correspond to the ports DQ0~DQ7 of the data bus DQ of the NAND flash memory dies 100_0~100_m–1 of each channel. For example, a general NAND flash memory die 100_0~100_m–1 can be provided with 8 different vendor-specific commands, and each vendor-specific command can correspond to a specific DQ port. For example, command 20h can be assigned to port DQ0, command 21h can be assigned to port DQ1, and so on. In this way, different vendor-specific commands can be used to assign correspondingly to each port. That is, as shown in FIG. 6A, under the cycle type of setting the R/B command, the internal chip enable signal CE # enables the die, and a command 20h is issued at DQ [7:0] of the data bus DQ.

In this way, through the setup stage, the vendor-specific commands can be used to map each port DQ0~DQ7 one-to-one to the internal R/B signal line of each NAND flash memory die, and the data (value) for indicating the corresponding relationship is stored in the R/B to DQ port correspondence register 106 shown in FIGS. 3B to 3E.

Figure 7A:
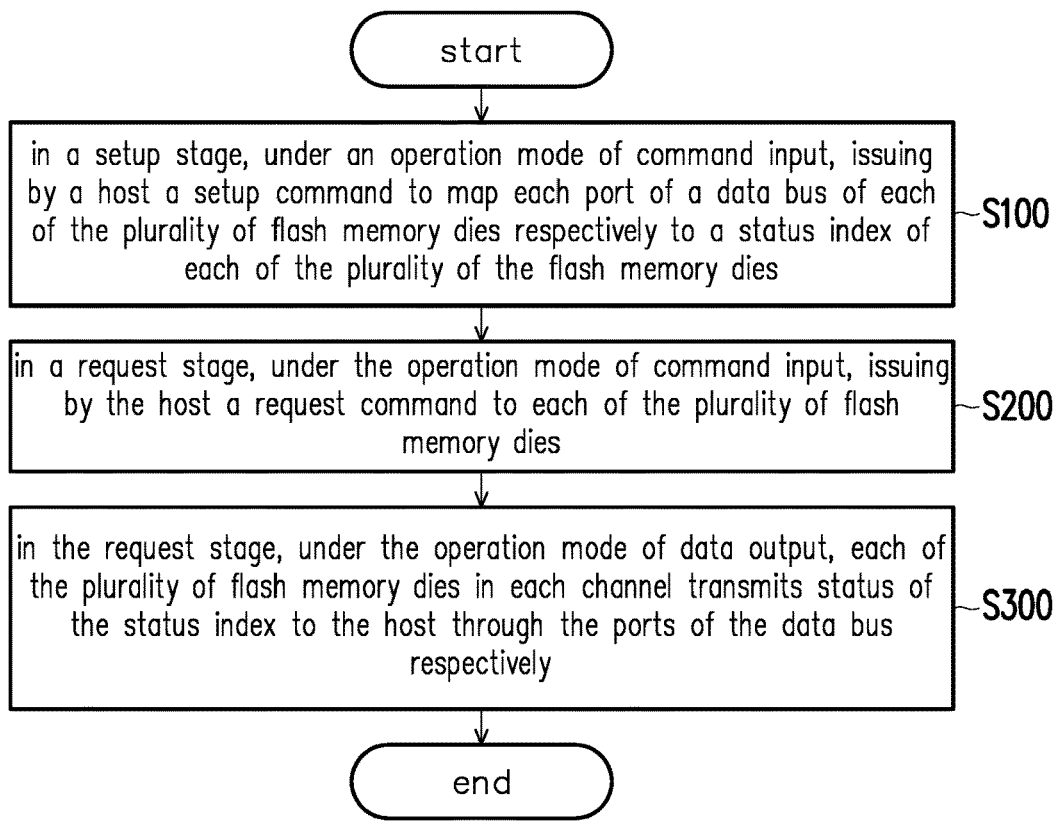
FIG. 7A shows a schematic diagram of an operation flow for the host controlling the NAND flash memory dies on the channel.

For the host level, in the setup stage, the operation flow diagram is shown in step S100 of FIG. 7A, under the operation mode of command input, the host (such as flash memory controller 200) issuing the setup command, so that each port DQ0~DQ7 of the data bus of each of the plurality of flash memory dies 100_0~100_m–1 is respectively mapped to the status index (R/B status) of each of the flash memory dies 100_0~100_m–1.

Referring again to FIG. 6A, then in the request stage, each NAND flash memory die 100_0 ( . . . 100_m–1) receives a request command issued by the NAND flash memory controller 200, i.e., another vendor-specific command is issued to each of the NAND flash memory dies 100_0~100_m–1.

In the request stage, as shown in FIG. 6A, when the operation mode is command input, at this time, the cycle type is to request R/B command, i.e., the multi-channel NAND flash memory controller 200 issues the request command to the NAND flash memory dies 100_0~100_m–1 to request the status of the R/B signal of each of the NAND flash memory dies 100_0~100_m–1. Then, under the operation mode of data output, each of the NAND flash memory dies 100_0~100_m–1 will use the corresponding DQ port DQ0~DQ7 to transmit the R/B for host status of each NAND flash memory die 100_0~100_m–1 to the NAND flash memory controller 200 through the data bus DQ.

For the host level, in the request stage, the operation flow diagram is shown in step S200 of FIG. 7A. Under the operation mode of command input, the host issues the request command to each of the flash memory dies 100_0~100_m–1. Next, in step S300, under the operation mode of data output, each of the flash memory dies 100_0~100_m–1 in each channel transmits the status of the status index (the R/B for host status) through the corresponding ports DQ0~DQ7 of the data bus DQ to the host.

In this way, for the flash memory dies 100_1~100_m–1 in the channel, the NAND flash memory controller 200 can acquire the R/B for host status of the flash memory dies 100_1~100_m–1 at a time through the ports DQ0~DQ7 of the data bus DQ without using the external R/B signal lines and pads, so that the number of pads of the controller can be reduced.

Figure 7B:
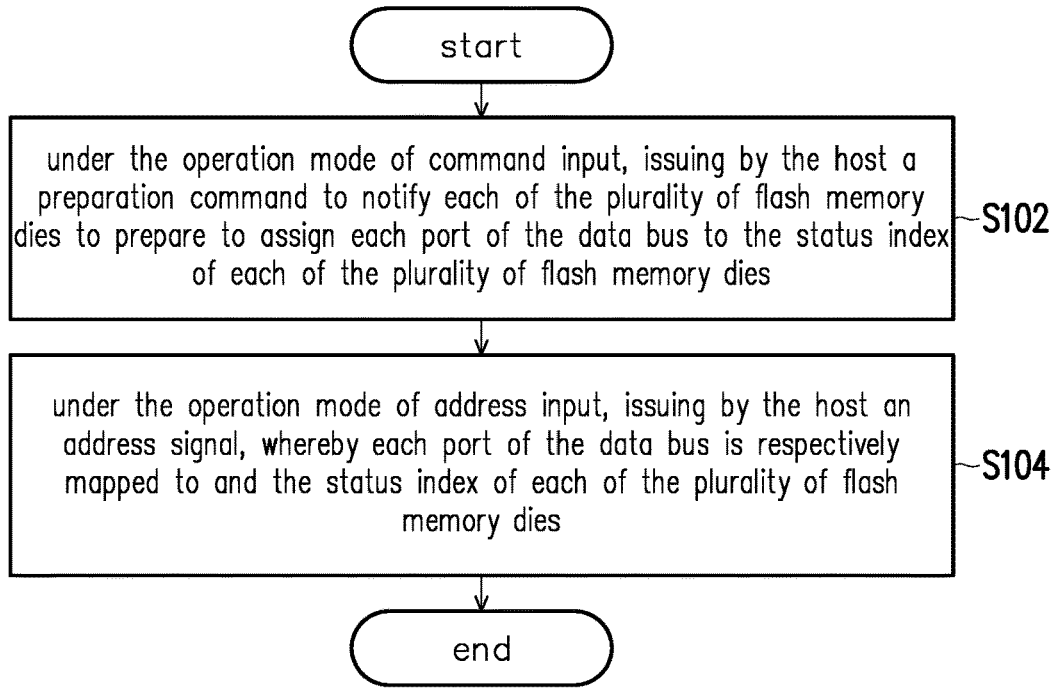
FIG. 7B is a schematic diagram of another operation flow for the setting stage of FIG. 7A.

FIG. 6B is a timing diagram illustrating an operation flow of each flash memory die of a control method of a NAND flash memory according to another embodiment of the disclosure. FIG. 7B is a schematic diagram of an operation flow in the setup stage for the host level.

As shown in FIG. 6B, in this embodiment, the setup stage can further include two cycles. In this embodiment, only the setup stage is different from the setup stage of FIG. 6A, but the request stage is basically the same. Therefore, only the operation of the setup stage is explained.

As shown in FIG. 6B, in the setup stage, the operation mode is divided into two cycles, the first cycle is the command input (CMD input) cycle, and the second cycle is an address input (ADDR input) cycle. Both form the cycle type of setting the R/B command.

After the enable signal CE # of the NAND flash memory die enables the die, under the operation mode of command input, the NAND flash memory die receives a prepare command issued by the NAND flash memory controller (host) 200. The preparation command can also be defined by a vendor-specific command, such as the command FEh shown in FIG. 6B. The preparation command mainly notifies or hints that each NAND flash memory die 100_0~100_m–1 is prepared to be assigned a corresponding DQ port for transmitting the RB status.

Then, in the second cycle that is the address input cycle, i.e., under the operation mode of the address input shown in FIG. 4B, the multi-channel NAND flash memory controller 200 will issue a specific address value, which corresponds to a specific DQ port and corresponds to a RB signal line of a NAND flash memory die. For example, at this stage, the value 00h corresponds to DQ0, the value 01h corresponds to DQ1, and so on.

Therefore, in this embodiment, in the first cycle of the setup stage, the multi-channel NAND flash memory controller 200 can first issue, for example, a command FEh to notify each of the NAND flash memory dies 100_0~100m–1 that the R/B signal lines thereof are ready to be related to the port DQ0~DQ7 of the data bus DQ, that is, the ports DQ0~DQ7 are prepared to be respectively mapped to the R/B signal lines of the NAND flash memory dies 100_0~100m–1. Then, in the second cycle of address input, by assigning the addresses values, the R/B signal line of each NAND flash memory die 100_0~100m–1 can be respectively associated to the port DQ0~DQ7. In this way, through the setup stage having two cycles, the vendor-specific commands and the address values can also be used to map the ports DQ0 DQ7 respectively to the internal R/B signal lines of the NAND flash memory dies, and the data (value) for indicating the corresponding relationship is stored in the mapping status register 106 shown in FIGS. 3B to 3E.

the operation flow diagram of this setup stage for the host level is shown in FIG. 7B. In the setup stage, the setup command issued by the host can further include: in step S102, under the operation mode of command input mode, a preparation command (such as the above command FEh) is issued on the data bus DQ to notify each of the flash memory dies 100_0~100_m−1 that each port DQ0~DQ7 of the data bus DQ is prepared to be assigned to the R/B signal line (status index) of each of the flash memory dies 100_0~100_m−1. Next, in step S104, under the operation mode of address input, the host issues an address signal ADDR (such as 00h, 01h, etc. above) on the data bus DQ. In this way, each port DQ0~DQ7 of the data bus DQ of each flash memory die 100_0~100_m−1 is respectively corresponding to the R/B signal line (status index) of each of the flash memory dies 100_0~100_m−1.

Figure 8:
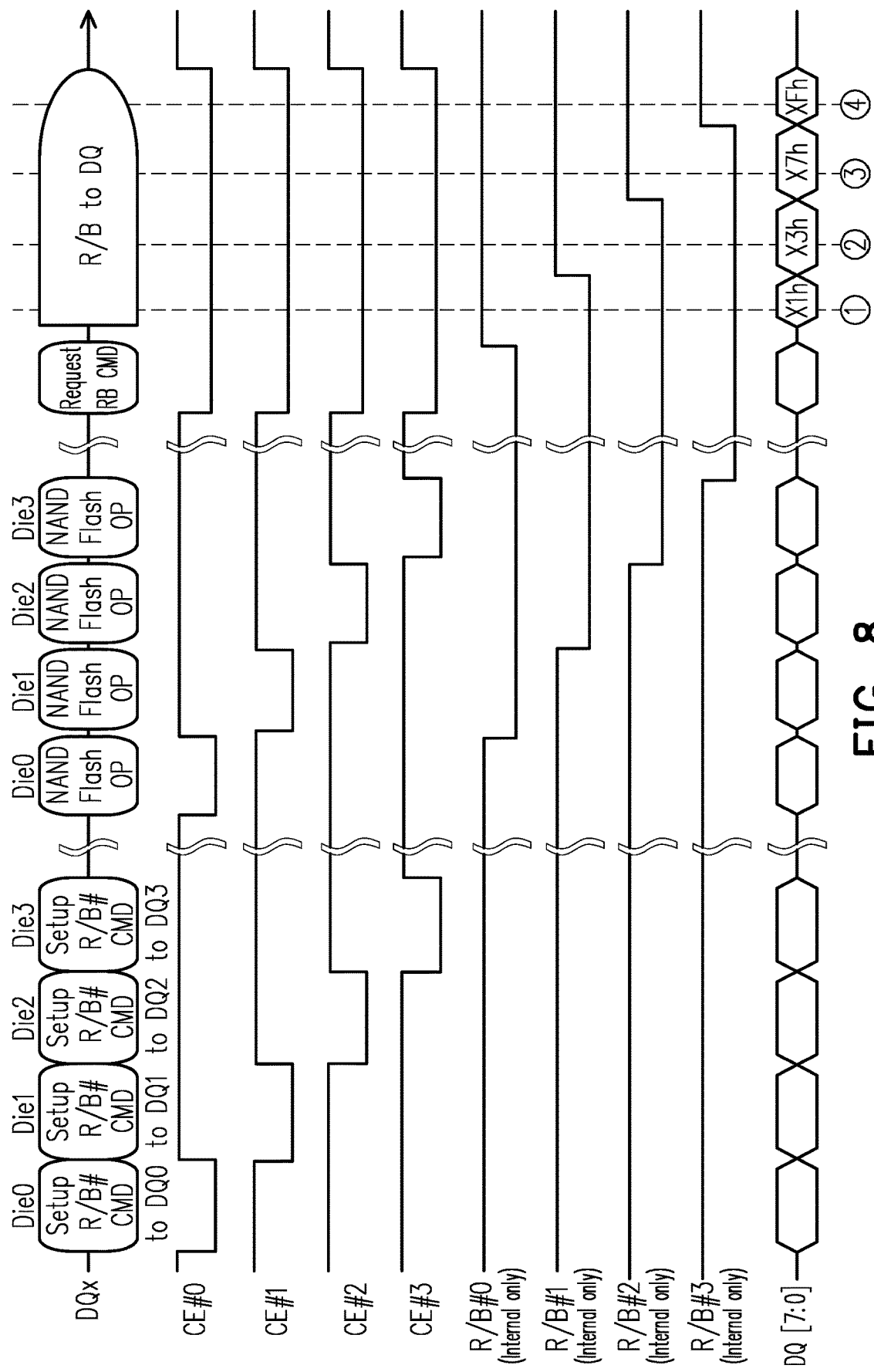
FIG. 8 is a schematic diagram illustrating the operation timing of the multi-channel flash memory controller according to an embodiment of the disclosure.

FIG. 8 is a schematic diagram illustrating the operation timing of the multi-channel flash memory controller according to an embodiment of the disclosure. When the flash memory starts to operate, data input and output have not been performed on the data bus DQ, that is, when the flash memory is in the idle state, the setup stage as shown in FIG. 6A or FIG. 6B can be performed to carry out the operation of setting R/B command for the flash memory dies 0~flash memory die 3. Then, the port DQ0~DQ3 of the data bus DQ are respectively assigned to be the R/B signal lines of the flash memory die 0~flash memory die 3. In other words, in the stage of setting flash memory die, the die 0 is set to output the R/B for host status using DQ0, and the other ports are in the high impedance status, and the die 1 is set to output the R/B for host status using DQ1, and the other ports are in the high impedance status. The setting is the same for other dies.

In addition, in the setup stage, when the controller (host) sets one of the flash memory dies 0~3, such that the port DQ0 of the flash memory die is selected to output the R/B for host status, the DQ0 of each of the flash memory dies, which is corresponding to the DQ0 of the flash memory die 0, will output the high impedance status. Similarly, the settings for the flash memory dies 1~3 are performed in the same way.

In this way, subsequently, the status of the R/B signal lines of each flash memory die 0~flash memory die 3 can be transmitted respectively through the port DQ0~DQ3 of the data bus DQ to the multi-channel flash memory controller 200. At this time, the internal R/B signal lines of the flash memory dies 0~3 are in the ready status.

Next, the flash memory die enters the operation mode, that is, various operations such as writing data to each flash memory die can be performed. At this time, the internal R/B signals of the flash memory dies 0~3 are in the busy status.

Then, after a period of time, the multi-channel flash memory controller issues a request RB command to each flash memory die 0~3. When each flash memory die 0~3 receives the request RB command, the status of the RB signal lines of the flash memory dies are transmitted to the multi-channel flash memory controller through the corresponding ports DQ0~DQ7. In this way, the multi-channel flash memory controller can acquire the RB status of each flash memory die 0~3 during the period from RB to DQ in FIG. 6.

In the request stage, the host will issue the request commends to all flash memory dies, and each flash memory dies 0~3 will map the eight outputs of the DEMUX 130 to port DQ [7:0] respectively, and finally the port DQ [7:0] for each flash memory dies 0~3 will transmit to the DQ bus. In this way, as shown in FIG. 8, a result of outputting X1h, X3h, . . . on the DO bus can be acquired. Since the host will distribute the corresponding port for each flash memory dies 0~3 in a setup stage, no outputs through multiple ports will be performed at the same time to preventing from signal interference. On the other words, two flash memory dies will not use the same port to output the status at the same time. Using the channel 0 in FIG. 3A as an example, during the status output, the flash memory die 0 outputs zzzz_zzz1 on its DQ [7:0], the flash memory die 1 outputs zzzz_zz0z on its DQ [7:0], the flash memory die 2 outputs zzzz_z0zz on its DQ [7:0], and the flash memory die 3 outputs zzzz_0zzzz on its DQ [7:0]. Finally, the DQ bus will output zzzz_0001 to indicate the status of the flash memory dies 0~3.

Therefore, under the configuration of the embodiment, the vendor-specific commands and data bus are used to substitute the RB signal lines of flash memory die, and therefore, the original R/B signal lines and pads of each flash memory die can be reduced, and the multi-channel flash memory controller correspondingly does not require the RB pad. Therefore, the number of pads of the controller can be effectively reduced, and the size and circuit complexity of the flash memory die is also not increased. In addition, the operation mode of this embodiment is performed using the operation mode of the data input and output, that is, the idle period of the data bus is used to set the R/B signal and DQ port, so that no additional operation is required and the assignment of R/B signals to the DQ ports can be easily made. In addition, the mapping status values can be output to the data bus DQ (external data bus) at the same time, so that times for sequentially polling the status of each flash memory die can be reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A flash memory die, at least comprising:
a plurality of output ports, coupled to an external data bus;
a control logic, providing status index of the flash memory die;
a mapping status register, storing data that indicates selecting one of the plurality of the output ports that is corresponding to the status index of the flash memory die; and
an input/output (I/O) control interface,
wherein the input/output (I/O) control interface further includes:
a first multiplexor having a plurality of inputs and an output coupled to the plurality of the output ports, wherein the plurality of the inputs receive data respectively from a plurality of internal buses, the first multiplexor selects one of the plurality of the inputs and outputs the selected input to the external data bus according to a selection signal from the control logic, and the plurality of the internal data buses includes at least an internal data bus, a status index bus and a mapping status bus; and
a demultiplexor, having an input, outputs and a select line, wherein the input receives the status index, the select line receives the data stored in the mapping status register, and the outputs of the demultiplexor are coupled to one of the inputs of the first multiplexor through the mapping status bus, wherein the demultiplexor selects one of the outputs based on the data received from the select line to transmit the status index, and non-selected outputs of the demultiplexor output a high impedance state.

2. The flash memory die according to claim 1, wherein when the flash memory die receives a setup command issued by a host controller, the status index of the flash memory die is mapped to one of the plurality of the output ports.

3. The flash memory die according to claim 2, wherein when the flash memory die receives a request command from the host controller, the demultiplexor of the I/O control interface selects the output port corresponding to the status index of the flash memory die according to the data stored in the mapping status register, and a status of the status index is transmitted to the host controller through the selected output port.

4. The flash memory die according to claim 3, wherein when receiving the request command, the plurality of the output ports, which are not selected, are in a high impedance status.

5. The flash memory die according to claim 3, wherein the setup command and the request command are defined by vendor-specific commands.

6. The flash memory die according to claim 1, wherein the status index is a ready/busy for the host controller.

7. The flash memory die according to claim 1, wherein the I/O control interface further comprises:
   a second multiplexor, having an output coupled to the input of the demultiplexor and selecting one of a plurality of status registers to output to the demultiplexor.

8. The flash memory die according to claim 1, wherein the I/O control interface further comprises a plurality of multiplexors that are coupled to the demultiplexor and includes a plurality of multiplexors,
   wherein each of the plurality of the multiplexors receives a plurality of status registers and selects one of the plurality of the status registers, and sends the one of the plurality of the status registers to the demultiplexor, and
   outputs of the plurality of multiplexors are provided to the demultiplexor and then the outputs of the demultiplexor are input to the first multiplexor through the mapping status bus.

* * * * *